United States Patent
Hair et al.

(10) Patent No.: US 11,081,948 B2
(45) Date of Patent: Aug. 3, 2021

(54) SYSTEM AND METHOD FOR IN-VEHICLE RESOLVER ALIGNMENT

(71) Applicant: FORD GLOBAL TECHNOLOGIES, LLC, Dearborn, MI (US)

(72) Inventors: Jonathan Hair, Royal Oak, MI (US); David Crist Gabriel, Troy, MI (US); Elizabeth Rose Bifano, Garden City, MI (US); Travis Smith, Westland, MI (US); Arun Ganesan, Farmington Hills, MI (US); Brian Khoi-Duy Nguyen, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 434 days.

(21) Appl. No.: 16/021,947

(22) Filed: Jun. 28, 2018

(65) Prior Publication Data
US 2020/0007017 A1    Jan. 2, 2020

(51) Int. Cl.
| | |
|---|---|
| H02K 24/00 | (2006.01) |
| B60K 6/20 | (2007.10) |
| H02P 6/15 | (2016.01) |
| H02P 6/16 | (2016.01) |
| G07C 5/08 | (2006.01) |
| H02K 11/33 | (2016.01) |
| H02K 11/35 | (2016.01) |
| H02K 11/21 | (2016.01) |

(52) U.S. Cl.
CPC ............ *H02K 24/00* (2013.01); *B60K 6/20* (2013.01); *G07C 5/0808* (2013.01); *H02K 11/21* (2016.01); *H02K 11/33* (2016.01); *H02K 11/35* (2016.01); *H02P 6/157* (2016.02); *H02P 6/16* (2013.01); *B60Y 2200/92* (2013.01)

(58) Field of Classification Search
CPC .. H02P 6/12; H02P 6/157; H02P 6/182; H02P 6/185; H02K 24/00; H02K 11/33; H02K 11/35; H02K 11/21; H02K 11/215; B60K 6/20; G07C 5/0808; B60Y 2200/92
See application file for complete search history.

(56) References Cited

U.S. PATENT DOCUMENTS

| | | | |
|---|---|---|---|
| 6,850,022 B2* | 2/2005 | Liu | H02P 6/16 318/400.13 |
| 7,423,396 B2* | 9/2008 | Bolt | H02P 6/16 318/400.34 |
| 7,659,688 B2 | 2/2010 | Schulz et al. | |
| 9,484,851 B2 | 11/2016 | Bang et al. | |
| 10,439,524 B1* | 10/2019 | Yang | H02P 6/182 |
| 2002/0171381 A1* | 11/2002 | Miyazaki | H02P 8/14 318/400.13 |

(Continued)

*Primary Examiner* — Bickey Dhakal
(74) *Attorney, Agent, or Firm* — David B. Kelley; Brooks Kushman P.C.

(57) ABSTRACT

An electric drive system for a vehicle includes a speed/position feedback device coupled to an electric machine and configured to provide an index pulse. The system further includes an inverter having a line voltage sensor. The system includes a controller programmed to, responsive to the electric machine rotating at a generally constant speed without commanding the inverter, generate a resolver offset from a time difference between a zero crossing of a line voltage and the index pulse and operate the inverter according to the resolver offset.

9 Claims, 5 Drawing Sheets

(56) References Cited

U.S. PATENT DOCUMENTS

| | | | | |
|---|---|---|---|---|
| 2003/0210006 A1* | 11/2003 | Kusaka | ................... | H02P 6/182 |
| | | | | 318/437 |
| 2004/0135530 A1* | 7/2004 | Liu | .......................... | H02P 6/16 |
| | | | | 318/400.34 |
| 2009/0237018 A1* | 9/2009 | Nakagawa | ............. | H02K 29/12 |
| | | | | 318/400.04 |
| 2010/0253262 A1* | 10/2010 | Celik | .................... | A47L 9/2884 |
| | | | | 318/400.14 |
| 2015/0042251 A1* | 2/2015 | Suzuki | ..................... | H02P 6/20 |
| | | | | 318/400.11 |
| 2015/0303843 A1* | 10/2015 | Fuwa | ....................... | H02P 9/48 |
| | | | | 318/400.38 |
| 2018/0183368 A1* | 6/2018 | Murakami | .............. | H02P 6/182 |

* cited by examiner

SYSTEM AND METHOD FOR IN-VEHICLE RESOLVER ALIGNMENT

TECHNICAL FIELD

This application generally relates to calibrating a speed/position measurement device coupled to an electric machine in a vehicle.

BACKGROUND

Electrified vehicles include an electric machine that is controlled by an inverter. The electric machine includes a rotor coupled to a shaft. The shaft is coupled to a drivetrain to provide torque to the drivetrain or receive torque from the drivetrain. The inverter controls the rotational speed of the electric machine by implementing a control strategy. The control strategy may control a current waveform to the electric machine based on a rotor position. To effectively implement the control strategy, accurate knowledge of the rotor position is needed. The rotor position is measured by a sensor coupled to the rotor shaft.

SUMMARY

A vehicle includes a resolver coupled to an electric machine and configured to provide an index pulse and an inverter having a line voltage sensor. The vehicle further includes a controller programmed to, responsive to the electric machine rotating at a constant speed not powered by the inverter, generate an offset for the resolver from a time difference between the index pulse and a zero crossing indicated by the line voltage sensor, and operate the inverter using the offset.

The controller may be further programmed to cause an engine that is coupled to the electric machine to rotate at a predetermined constant speed. The inverter may be configured to provide a U-phase voltage, a V-phase voltage, and W-phase voltage and wherein the line voltage sensor is configured to measure a voltage difference between the V-phase voltage and the W-phase voltage. The controller may be further programmed to derive the offset from a period of oscillation indicated by the line voltage sensor. The controller may be further programmed to derive the offset as a ratio of the time difference and the period. The controller may be further programmed to derive the offset during a drive cycle. The controller may be further programmed to derive the offset responsive to a diagnostic mode request. The controller may be further programmed to, responsive to a first vehicle ignition cycle, operate the inverter to control the electric machine in a reduced torque capability mode of operation, and, responsive to generating the offset, operate the inverter to control the electric machine in a full torque capability mode of operation. The offset in degrees may be derived as a product of a value representing one full rotation of the resolver and a ratio of the time difference to a period of oscillation indicated by the line voltage sensor.

A method includes operating an engine coupled to an electric machine at a predetermined speed and operating, by a controller, the electric machine according to an offset of a resolver coupled to the electric machine derived from a time difference between a zero crossing of a line voltage across phase windings of the electric machine and an index pulse of the resolver.

The method may further include operating, responsive to a first vehicle ignition cycle, an inverter to control the electric machine in a reduced torque capability mode of operation, and operating, responsive to generating the offset, the inverter to control the electric machine in a full torque capability mode of operation. The offset may be further derived from a period of oscillation of the line voltage. The offset may be derived as a product of a value representing one full rotation of the resolver and a ratio of the time difference to a period of oscillation of the line voltage. The method may further include operating, by the controller, power switching devices that control voltage applied to the electric machine so that no power switching devices are in an on state for a predetermined time interval.

An electric drive system includes a resolver coupled to an electric machine and configured to provide an index pulse and an inverter having a line voltage sensor. The electric drive system further includes a controller programmed to operate the inverter according to a resolver offset that is updated during a drive cycle according to a time difference, between a zero crossing of a line voltage and the index pulse, measured during the drive cycle when the electric machine is unpowered.

The controller may be further programmed to, responsive to a speed of the electric machine being within a predetermined range with no demand for electric machine torque, operate the inverter such that the electric machine is unpowered. The controller may be further programmed to, responsive to the resolver offset being unlearned, operate the inverter and electric machine in a reduced torque capability mode of operation, and, responsive to generating the resolver offset, operate the inverter and electric machine in a full torque capability mode of operation. The inverter may be configured to provide a U-phase voltage, a V-phase voltage, and W-phase voltage to the electric machine and wherein the line voltage sensor is configured to measure a voltage difference between the V-phase voltage and the W-phase voltage. The controller may be further programmed to derive the resolver offset from a period of oscillation of the line voltage. The controller may be further programmed to derive the resolver offset as a product of a value representing one full rotation and a ratio of the time difference to the period.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
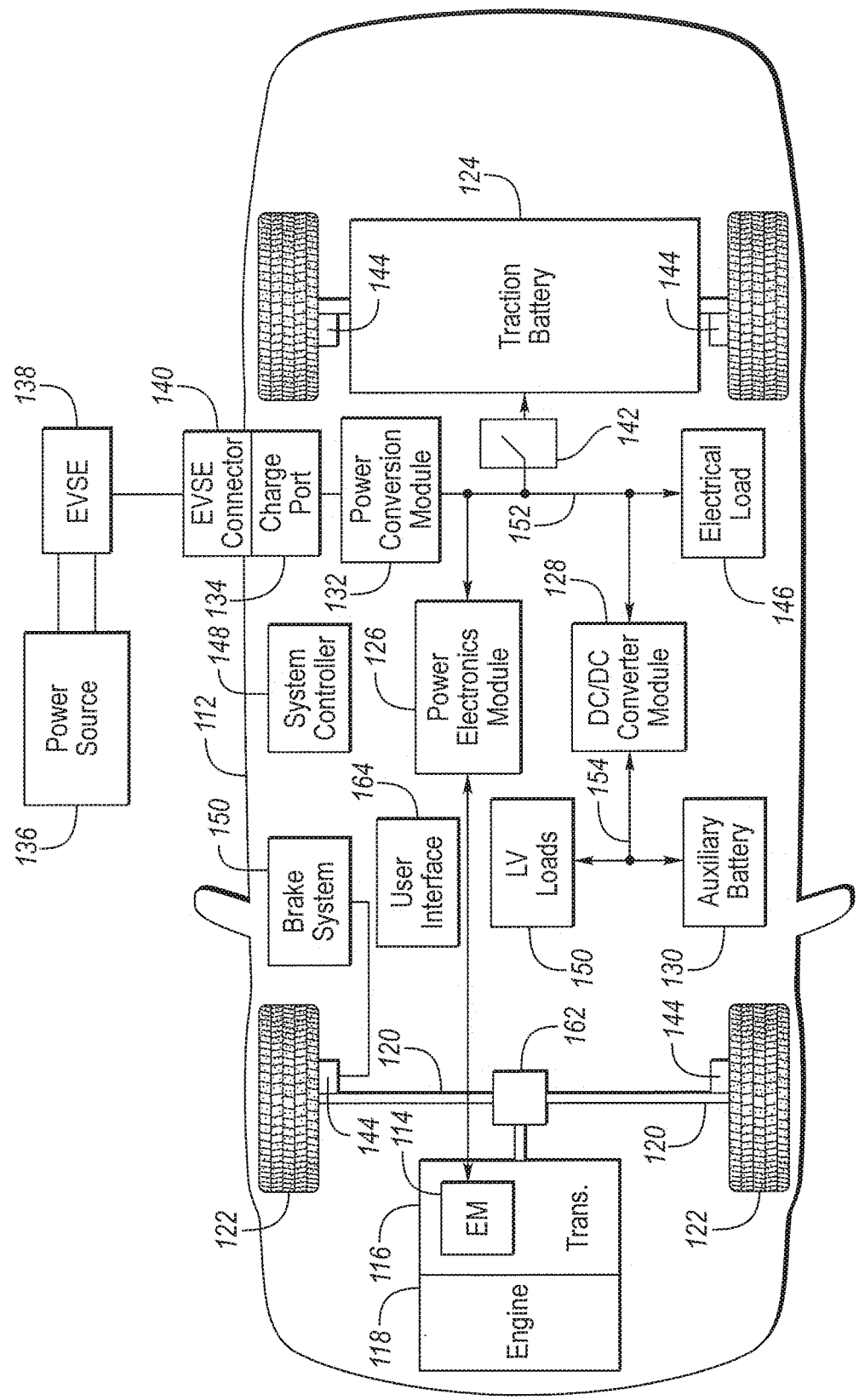
FIG. 1 depicts a possible configuration for an electrified vehicle.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 may be mechanically coupled to a differential 162 that is configured to adjust the speed of drive shafts 120 that are mechanically coupled to drive wheels 122 of the vehicle 112. The drive shafts 120 may be referred to as the drive axle. In some configurations, a clutch may be disposed between the hybrid transmission 116 and the differential 162. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be integrated with the traction battery 124. One or more power electronics modules 126 may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage bus 152. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components. Note that operations and procedures that are described herein may be implemented in one or more controllers. Implementation of features that may be described as being implemented by a particular controller is not necessarily limited to implementation by that particular controller. Functions may be distributed among multiple controllers communicating via the vehicle network.

The vehicle 112 may include a user interface 164 for interfacing with the operator. The user interface 164 may include display elements, such as lamps or a liquid-crystal display (LCD) module. The display elements may include a touch screen. The user interface 164 may further include input devices, such as switches, buttons, or touch-screen inputs. The user interface 164 may further include a diagnostic port that interfaces with an external diagnostic module. The diagnostic port may include conductors that are coupled to the vehicle network. The diagnostic port may permit the external diagnostic module to interface with controller in the vehicle 112. The external diagnostic module may be configured to send commands to the controllers. For example, various test modes may be entered by commands from the diagnostic module. Controllers in the vehicle may transmit message data to the diagnostic module. The message data may include responses to diagnostic requests as well as status information.

An operator of the vehicle may provide a demand for propulsive power by actuating an accelerator pedal. The propulsive power may be an amount of power that is supplied to the drive shafts 120 to propel the vehicle. Depressing the accelerator pedal may cause an increase in propulsive power that is demanded from the hybrid powertrain. Releasing the accelerator may cause a decrease in the propulsive power demanded. The hybrid powertrain may be configured to respond to the accelerator pedal input by changing the propulsive power supplied to the drive wheels.

In configurations that include a clutch, the clutch may be electrically activated and controlled. Clutch control signals may be interfaced to a powertrain controller. Other modules may request an open clutch or closed clutch via the vehicle network. When the clutch is opened, no torque is transferred from the electric machines 114 and the engine 118 to the drive axle 120. When the clutch is closed, torque is transferred from the engine 118 and the electric machines 114 to the drive axle 120. The clutch may selectively isolate the torque-producing components from the drive axle 120.

The hybrid powertrain 116 may be a power split configuration. The power split configuration may include a first electric machine that is configured to operate primarily as a generator. The power split configuration may include a second electric machine that is configured to provide propulsive power to the drive wheels. The engine 118 may be operated to drive the generator and provide propulsive power to the drive shafts 120. During a demand for propulsive power, the engine, generator and motor may be operated to achieve the demand. Power may be apportioned between the engine, the generator, and the motor to achieve the demand. Note that power to operate the electric machines may be supplied by the traction battery 124. Available power for the motor may be affected by charge and discharge limits of the traction battery 124. Various modes of operation are possible. For example, the engine 118 may drive the generator to supply power to the traction battery 124, the motor, and/or other electrical loads.

The electric machines 114 may be a permanent magnet synchronous motor (PMSM) type machine. A PMSM electric machine includes a rotor and a stator. The stator may include windings for producing a magnetic field to rotate the rotor. Current through the stator windings may be controlled to vary the magnetic field acting on the rotor. The rotor of a PMSM includes permanent magnets that create a magnetic field that interacts with the stator magnetic field to cause rotation of the rotor. The rotor speed may be controlled by the frequency of the magnetic field created by the stator.

The electric machines 114 may be comprised of a stator that includes stator windings and a rotor. The rotor may rotate about a central axis relative to the stator. The electric machines 114 may be controlled by flowing a generally sinusoidal current through stator windings. The amplitude and frequency of the current may be varied to control the torque and speed of the rotor. The stator current creates an electromagnetic field that interacts with the permanent magnets that are part of the rotor. This electromagnetic field causes the rotor to rotate. The electric machines 114 may be configured as three-phase machines. That is, the stator windings may include three separate phase windings. To control the electric machines 114, a three-phase voltage or current waveform is applied to the phase windings. The three-phase waveform is such that each phase signal is separated by a phase difference of 120 degrees.

Figure 2:
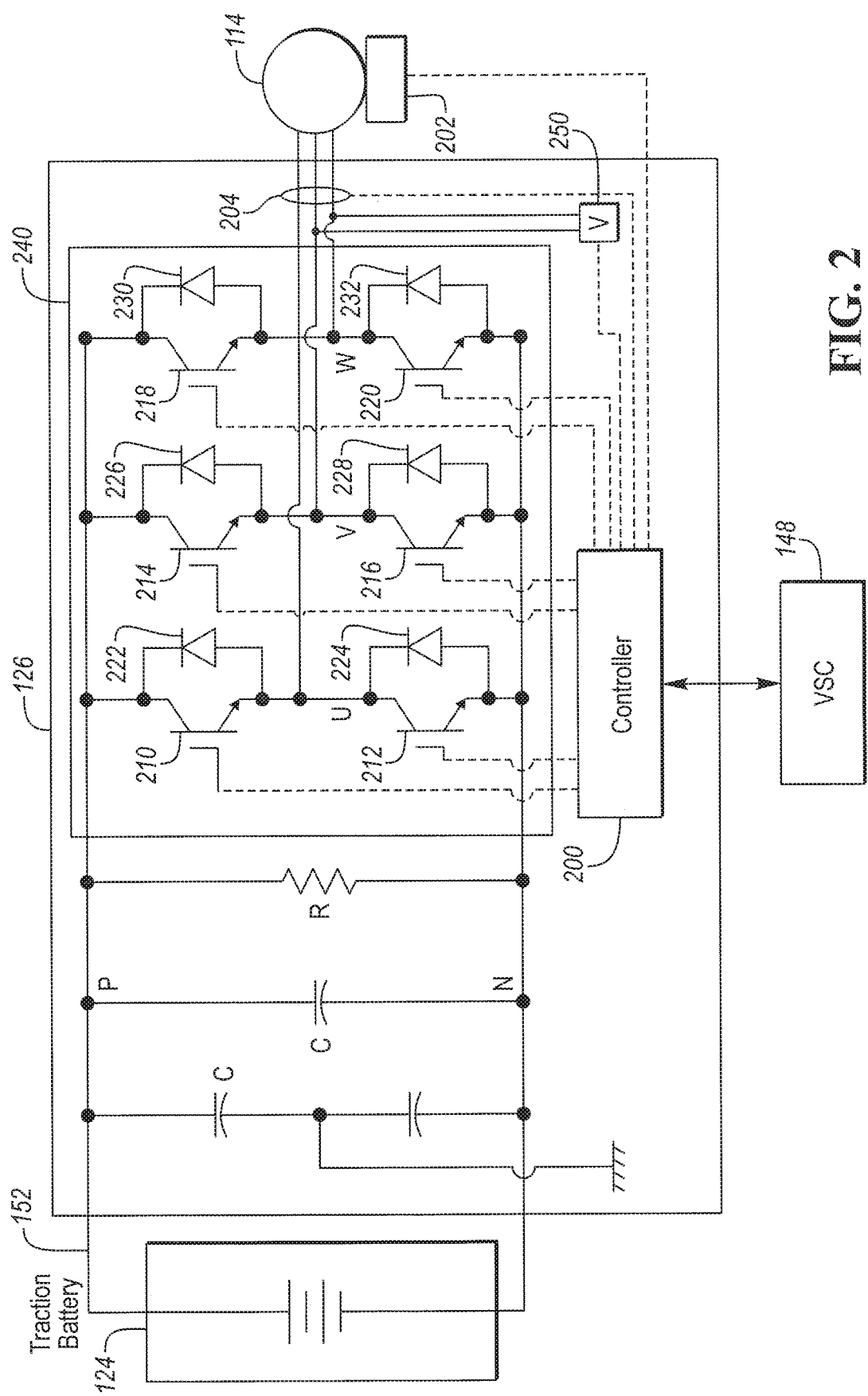
FIG. 2. depicts a possible configuration for a vehicle system including power electronics associated with an electric machine.

The electric machines 114 may be coupled to the power electronics module 126 via one or more conductors that are associated with each of the phase windings. FIG. 2 depicts a block diagram of a portion of an electric drive system for a vehicle. The vehicle 112 may include one or more power electronics controllers 200 configured to monitor and control the components of the power electronics module 126. The conductors may be part of a wiring harness between the electric machine 114 and the power electronics module 126. A three-phase electric machine 114 may have three conductors coupled to the power electronics module 126. The power electronics module 126 may be configured to switch positive and negative terminals of the high-voltage bus 152 to phase terminals of the electric machines 114. The power electronics module 126 may be controlled to provide sinusoidal voltage and current signals to the electric machine 114. The frequency of the signals may be proportional to the rotational speed of the electric machine 114. The controller 200 may be configured to adjust the voltage and current output of the power electronics module 126 at a predetermined switching frequency. The switching frequency may be the rate at which the states of switching devices within the power electronics module 126 are changed.

The power electronics module 126 may interface with a position/speed feedback device 202 that is coupled to the rotor of the electric machine 114. For example, the position/speed feedback device 202 may be a resolver or an encoder. The position/speed feedback device 202 may provide signals indicative of a position and/or speed of the rotor of the electric machine 114. The power electronics 126 may include a power electronics controller 200 that interfaces to the speed feedback device 202 and processes signals from the speed feedback device 202. The power electronics controller 200 may be programmed to utilize the speed and position feedback to control the power electronics module 126 to operate the electric machine 114.

The inverter or power electronics module 126 may include power switching circuitry 240 that includes a plurality of switching devices 210, 212, 214, 216, 218, 220. The switching devices may be Insulated Gate Bipolar Junction Transistors (IGBTs) or other solid-state switching devices. The switching devices may be configured to selectively couple a positive terminal and a negative terminal of the high-voltage bus 152 to each phase terminal or leg (e.g., labeled U, V, W) of the electric machine 114. The power electronics 126 may be configured to provide a U-phase voltage, a V-phase voltage and a W-phase voltage to the electric machine 114. Each of the switching devices within the power switching circuitry 240 may have an associated diode 222, 224, 226, 228 230, 232 connected in parallel to provide a path for inductive current when the switching device is in a non-conducting state. Each of the switching devices 210, 212, 214, 216, 218, 220 may have a control terminal for controlling operation of the associated switching device. The control terminals may be electrically coupled to the power electronics controller 200. The power electronics controller 200 may include associated circuitry to drive and monitor the control terminals. For example, the control terminals may be coupled to the gate input of the solid-state switching devices.

A first switching device 210 may selectively couple the HV-bus positive terminal to a first phase terminal (e.g., U) of the electric machine 114. A first diode 222 may be coupled in parallel to the first switching device 210. A second switching device 212 may selectively couple the HV-bus negative terminal to the first phase terminal (e.g., U) of the electric machine 114. A second diode 224 may be coupled in parallel to the second switching device 212. A third switching device 214 may selectively couple the HV-bus positive terminal to a second phase terminal (e.g., V) of the electric machine 114. A third diode 226 may be coupled in parallel to the third switching device 214. A fourth switching device 216 may selectively couple the HV-bus negative terminal to the second phase terminal (e.g., V) of the electric machine 114. A fourth diode 228 may be coupled in parallel to the fourth switching device 216. A fifth switching device 218 may selectively couple the HV-bus positive terminal to a third phase terminal (e.g., W) of the electric machine 114. A fifth diode 230 may be coupled in parallel to the fifth switching device 218. A sixth switching device 220 may selectively couple the HV-bus negative terminal to the third phase terminal (e.g., W) of the electric machine 114. A sixth diode 232 may be coupled in parallel to the sixth switching device 220.

The power electronics controller 200 may be programmed to operate the switching devices 210, 212, 214, 216, 218, 220 to control the voltage and current applied to the phase windings of the electric machine 114. The power electronics controller 200 may operate the switching devices 210, 212, 214, 216, 218, 220 so that each phase terminal is coupled to only one of the HV-bus positive terminal or the HV-bus negative terminal at a particular time.

Various motor control algorithms and strategies are available to be implemented in the power electronics controller 200. The power electronics module 126 may also include current sensors 204. The current sensors 204 may be inductive or Hall-effect devices configured to generate a signal indicative of the current passing through the associated circuit. In some configurations, two current sensors 204 may be utilized and the third phase current may be calculated from the two measured currents. The controller 200 may sample the current sensors 204 at a predetermined sampling rate. Measured values of the phase currents of the electric machine 114 may be stored in controller memory for later computations.

The power electronics module 126 may include one or more voltage sensors. The voltage sensors may be configured to measure an input voltage to the power electronics module 126 and/or one or more of the output voltages of the power electronics module 126. The power electronics module 126 may include a line voltage sensor 250 that is configured to measure a line voltage across the V and W phase outputs. The voltage may be a voltage difference between the V-phase voltage and the W-phase voltage. The voltage sensors may be resistive networks and include isolation elements to separate high-voltage levels from the low-voltage system. In addition, the power electronics module 126 may include associated circuitry for scaling and filtering the signals from the current sensors 204 and the voltage sensors.

Under normal operating conditions, the power electronics controller 200 controls operation of the electric machine 114. For example, in response to torque and/or speed setpoints, the power electronics controller 200 may operate the switching devices 210, 212, 214, 216, 218, 220 to control the torque and speed of the electric machine 114 to achieve the setpoints. The torque and/or speed setpoints may be processed to generate a desired switching pattern for the switching devices 210, 212, 214, 216, 218, 220. The control terminals of the switching devices 210, 212, 214, 216, 218, 220 may be driven with Pulse Width Modulated (PWM) signals to control the torque and speed of the electric machine 114. The power electronics controller 200 may implement various well-known control strategies to control the electric machine 114 using the switching devices such as vector control and/or six-step control. During normal operating conditions, the switching devices 210, 212, 214, 216, 218, 220 are actively controlled to achieve a desired current through each phase of the electric machine 114.

Figure 3:
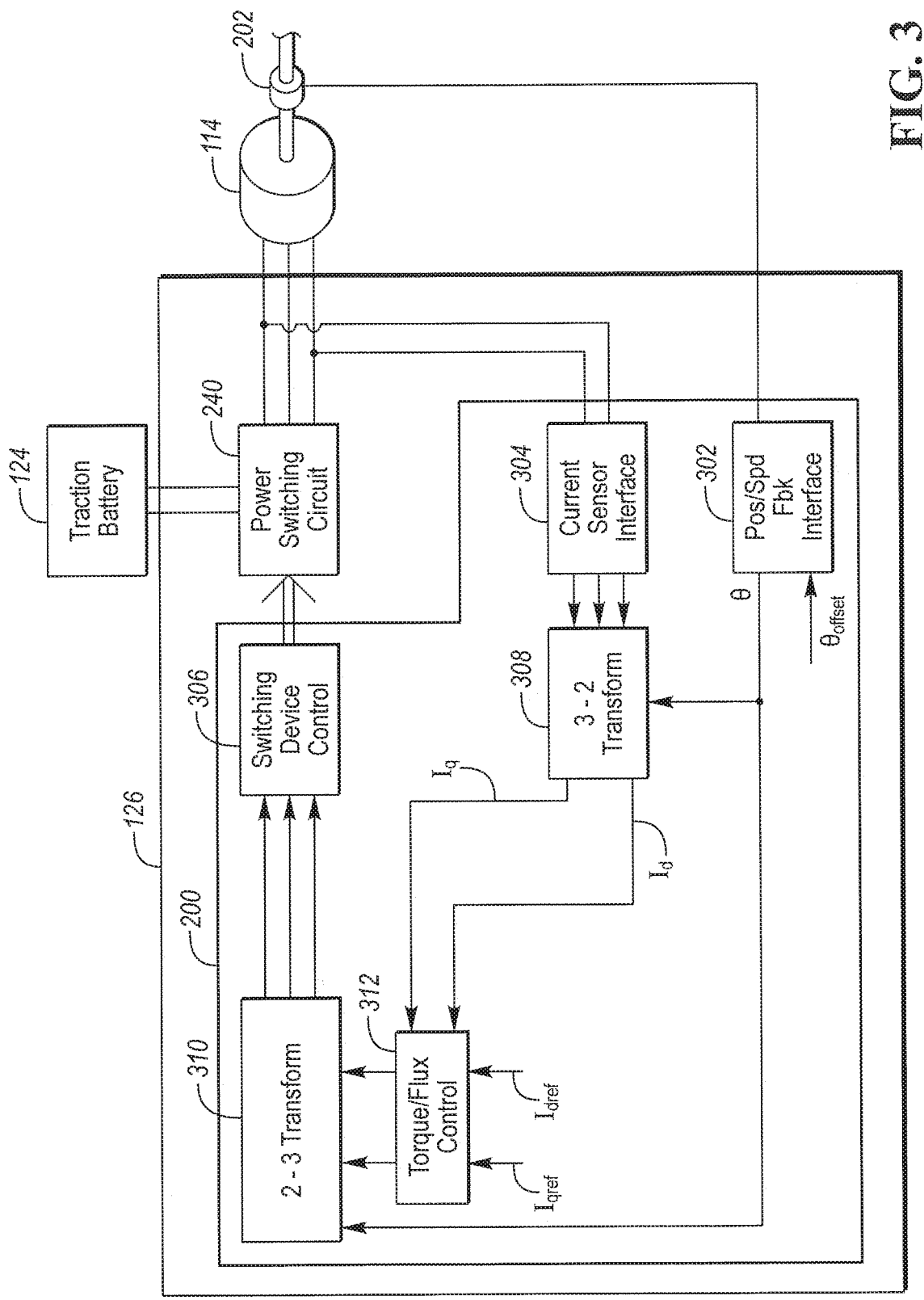
FIG. 3 depicts a possible block diagram for control logic in a controller for an electric machine.

FIG. 3 depicts a block diagram of control logic that may be implemented in the power electronics controller 200. The power electronics module 126 may be configured to provide a voltage to the electric machine 114 that results in a current flowing through the electric machine 114. The controller 200 may implement a field-oriented control scheme to control the electric machine 114. Field-oriented control of electric machines 114 is well-known in the art so only limited aspects may be described herein.

The power electronics controller 200 may include a position/speed feedback interface 302. The position/speed feedback interface 302 may include hardware and software that is configured to process signals from the position/speed feedback device 202. For example, when the position/speed feedback device 202 is a resolver, the interface may include an integrated circuit that processes the resolver signals to generate a digital angular position value. The position/speed feedback interface 302 may output an angular position value of the rotor. An angular speed of the rotor may be derived from a derivative of the angular position value with respect to time. In some configurations, the position/speed feedback interface 302 may output an angular speed of rotor. The position/speed feedback interface 302 may include scaling of the signals to account for the number of electric machine poles and the number of resolver poles. The resolver may include two sets of windings. A first set of windings may return a signal that is the sine of the rotational angle and a second set of windings may return a signal that is the cosine of the rotation angle of the resolver shaft. The resolver angle may be computed as the arc-tangent of the sine of the angle divided by the cosine of the angle. The position/speed feedback interface 302 may receive a resolver offset input to compensate for resolver and electric machine alignment. The resolver offset may be added to the value derived from the position/speed feedback device 202 and output as the angular position.

Field-oriented electric machine control may define an alternate coordinate system for controlling voltages and currents of the electric machine 114. The coordinate system selected allows for simpler control logic than the three-phase coordinate system of the electric machine 114. The selected coordinate system may transform the three-phase alternating voltage and currents into a coordinate system in which the voltages and currents are represented by DC voltages and currents. The transformation to DC values allows for more effective controls to be implemented.

The three phase values may be transformed into a two-axis coordinate system using one or more coordinate transformations. The three phase values may be measured or calculated values (e.g., voltages and/or currents). For example, in field-oriented electric machine control, coordinate transformations, such as the Park and Clarke coordinate transformations, are well known. The output of one coordinate transformation may be a vector in a stationary two-axis reference frame. One possible transformation from the three-phase quantities is the Clarke transformation which may be expressed as $$\begin{bmatrix} X_\alpha \\ X_\beta \end{bmatrix} = \begin{bmatrix} 2/3 & -1/3 & -1/3 \\ 0 & 1/\sqrt{3} & -1/\sqrt{3} \end{bmatrix} \begin{bmatrix} X_U \\ X_V \\ X_W \end{bmatrix} \quad (1)$$

where $X_U$, $X_V$, and $X_W$ are the three-phase values which may represent a current (I) or voltage (V). Note that the three-phase values may differ by a phase angle. For example, $X_U$ may be a sinusoidal signal, $X_V$ may be shifted by 120 degrees from $X_U$, and $X_W$ may be shifted by 240 degrees from $X_U$. One axis of the stationary frame may be aligned with the U-phase such that at an angle of zero, the stationary frame component and the $X_U$ value are equal.

The Clarke transformation converts a three-phase system into the stationary two-axis reference frame. For control purposes, it may be desired to perform calculations with respect to a two-axis reference frame that rotates with respect to the stationary frame. One possible transformation is the Park transformation which may be expressed as $$\begin{bmatrix} X_d \\ X_q \end{bmatrix} = \begin{bmatrix} \cos(\theta) & \sin(\theta) \\ -\sin(\theta) & \cos(\theta) \end{bmatrix} \begin{bmatrix} X_\alpha \\ X_\beta \end{bmatrix} \quad (2)$$

where θ is the angle of the rotating frame with respect to the stationary frame. The angle θ may be relative to the U-phase of the original three-phase waveform such that at an angle of zero, the q-axis is aligned with the U-phase. The rotating reference frame proves useful for motor control purposes as a rotating reference frame may be chosen in which the d-axis and q-axis values behave as DC values instead of alternating values. For example, a current vector having a d-component and a q-component may be utilized for controlling the current in the electric machine 114. The d-component may represent a flux component, and the q-component may represent a torque component. Adjusting the torque of the electric machine 114 is then achieved by adjusting the torque component.

The flux and torque of the electric machine 114 may be controlled by adjusting the d-component and the q-component of the voltage or current. A flux controller may be implemented to adjust the d-component. The flux controller may input an error between a reference flux current and the measured flux current (d-component). The flux controller may output a d-component voltage command that may achieve the reference flux current. A torque controller may be implemented to adjust the q-component. The torque controller may input an error between a reference torque current and the measured torque current (q-component). The torque controller may output a q-component voltage command that may achieve the reference torque current.

The advantage of the rotating reference frame is evident when considering a three-phase sinusoid having a constant amplitude and frequency. In the stationary two-axis reference frame, the $X_\alpha$ and $X_\beta$ components will vary at the frequency of the sinusoidal signal. The same signal may be represented in a rotating reference frame that rotates at the same constant frequency. In the rotating reference frame, the $X_d$ and $X_q$ components will appear to be constant values. Control operations may be performed on the rotating reference frame variables and then converted back to the equivalent three-phase values.

Quantities in the rotating reference frame may be returned to the stationary reference frame by the inverse of the Park transformation which may be expressed as $$\begin{bmatrix} X_\alpha \\ X_\beta \end{bmatrix} = \begin{bmatrix} \cos(\theta) & -\sin(\theta) \\ \sin(\theta) & \cos(\theta) \end{bmatrix} \begin{bmatrix} X_d \\ X_q \end{bmatrix} \quad (3)$$

A quantity in the stationary two-axis reference frame may be returned to the three-phase frame using the inverse of the Clarke transformation which may be expressed as $$\begin{bmatrix} X_U \\ X_V \\ X_W \end{bmatrix} = \begin{bmatrix} 1 & 0 \\ -1/2 & \sqrt{3}/2 \\ -1/2 & -\sqrt{3}/2 \end{bmatrix} \begin{bmatrix} X_\alpha \\ X_\beta \end{bmatrix} \quad (4)$$

The description above represents one possible coordinate transformation scheme. Other transformations are possible. In actual implementation, the transformation matrices may be combined to reduce the number of computations required. As described above, the control strategy uses the resolver position to perform the transformations.

FIG. 3 further depicts a block diagram for a control system that may be implemented in a power electronics controller 200 that is part of the power electronics module 126. The control strategy may implement a torque/flux control function 312. The torque/flux control function 312 may output signals to achieve reference values for the d-axis and q-axis components. The torque/flux control function 312 may input a torque component reference, $I_{qref}$, and a flux component reference, $I_{dref}$. In addition, a measured torque component, $I_q$, and a measured flux component, $I_d$, may also be input to the torque/flux control function 312.

The d-axis and q-axis component values may be transferred to a 2-3 phase transform block 310. The 2-3 phase transform block 310 may convert the d-axis and q-axis components to a three-phase voltage or current waveform. For example, the 2-3 phase transform block 310 may implement equations (3) and (4). The 2-3 phase transform block 310 may input the resolver position.

The three-phase values may be transferred to a switching device control 306 function. The switching device control function 306 may process the three-phase values into a switching pattern for the switching devices of the power switching circuitry 240. For example, the switching device control function 306 may output six gate-drive signals. The switching device control function 306 may convert the three-phase values into pulse-width modulated gate drive signals.

The power switching circuitry 240 is electrically coupled to the traction battery 124. The power switching circuitry 240 may output three-phase signals to the electric machine 114 that cause the electric machine 114 to create torque and rotation. The angular position of the rotor of the electric machine 114 may be measured by the resolver 202. A position/speed feedback interface 302 may be implemented to convert signals from the resolver to an absolute position of the rotor. The rotor position from the position/speed feedback interface 302 may be input to the 2-3 phase transform block 310.

The power electronics controller 200 may include a current sensor interface 304 to convert signals from the current sensors to digital values for use by the control strategy. The three-phase currents that are measured and converted may be output to a 3-2 phase transform block 308. The rotor position from the position/speed feedback interface 302 may be input to the 3-2 phase transform block 308.

The 3-2 phase transform block 308 may convert the three-phase values to two-phase values in the rotating reference frame. That is, the three-phase currents may be converted to a torque component in the q-axis ($I_q$) and a flux component in the d-axis ($I_d$). For example, the 3-2 phase transform block may implement equations (1) and (2).

As observed above, the transformations depend on the angle of the rotating frame with respect to the stationary frame. The angle can be obtained from the position feedback measurement device 202 coupled to the shaft of the electric machines 114. For example, a resolver provides an absolute position value based on the angle of rotation of the resolver shaft. That is, at a given position, the resolver returns the same value each time the resolver is turned to the given position. In order to use the resolver values in the transformations, the relationship between the resolver value and the angle between the stationary and rotating reference frames should be identified. To operate effectively, the d-axis should be aligned with the permanent magnetic field of the rotor (e.g., rotor flux field). That is, the resolver position representing the rotor position when the d-axis and rotor flux field are aligned may need to be known.

During assembly, the resolver shaft may be coupled to the rotor shaft. A zero position of the resolver may be aligned with the expected rotor flux field of the rotor and the d-axis of the control field. For example, the rotor shaft may include a cutout that corresponds to the rotor flux field. The resolver shaft may include a notch configured to mate with the cutout in rotor shaft to provide an initial alignment between the resolver value and the rotor flux field. The desired alignment may be such that at an angle of zero, the motor U-phase is aligned with the center of the resolver sine winding. In addition, the resolver may be mounted in a fixed manner relative to the stator such that the rotor flux field is aligned with the d-axis. This may provide an initial estimate of the rotor flux field position and the d-axis. However, due to manufacturing and assembly tolerances, the alignment may not be precise. Due to this, the d-axis and the rotor flux field may not be precisely aligned and the resolver value for alignment may not be known precisely. In configurations in which there are no physical alignment devices, a method of learning the alignment may be used to improve control. For example, a resolver value corresponding to an offset angle between the rotating frame and the stationary frame must be learned. This relationship may be expressed as a resolver offset. For example, an offset added to the resolver angle may yield the correct resolver value at which the rotor flux field and the d-axis of the rotating reference frame are aligned. Once identified, the resolver offset may be stored in non-volatile memory for continued use. The issue for control purposes is to identify this resolver offset value. If the offset between the resolver position and the stationary frame is not known precisely, the torque control may be inaccurate.

The above scheme of physically aligning the resolver to a known value may increase assembly time. Further, the addition of a cutout and notch requires additional processing for the electric machine shaft and resolver shaft. An improved resolver offset scheme may eliminate the need for these features. Previous alignment procedures often require a calibration procedure that can only be performed under limited conditions. For example, the calibration routine may be executed by a service technician after entering a special diagnostic mode of operation.

The position/speed feedback device 202 may be configured to provide an electrical pulse at a predetermined angle. For example, the position/speed feedback device 202 may be configured to output an electrical pulse once for every full rotation of the shaft. The pulse may be referred to as a marker or index pulse. The index pulse may correspond to a zero value of the position/speed feedback device 202. That is, when the feedback value is zero, the pulse may be generated. The logic described may also be applied systems in which the index pulse corresponds to a non-zero value (e.g., ninety-degree value). The pulse may be generated for each full rotation of the resolver shaft. As such, an angular distance of 360 degrees or two-pi radians may be traversed between consecutive pulses. The index pulse may be generated electronically by the circuitry. For example, a resolver circuit may generate an index pulse at a certain resolver value. In other configurations, there may be a magnetic sensor that is configured to generate a pulse for each resolver revolution at the corresponding feedback value.

A method for determining the resolver offset may include monitoring a voltage of the electric machine 114. When the shaft of a permanent magnet electric machine is rotated by an external force, a voltage will be induced in the stator windings. This voltage may be referred to as the back electromotive force (back-EMF). If the electric machine 114 is rotated, a sinusoidal back-EMF may be observed on the stator windings. The magnitude and frequency of the back-EMF may be related to the speed of rotation.

Electric machine voltages may be measured as phase voltages and/or line voltages. Phase voltages may be the voltage measured across each of the phase windings. The phase voltages may be measured as the voltage from the electric machine terminals and the neutral terminal. For a three-phase electric machine, the phase voltages are the U-phase, the V-phase, and the W-phase. Line voltages may be the voltage across pairs of phase terminals of the electric machine. The line voltage may include voltages across pairs of the phase windings. For a three-phase electric machined, the line voltages are UV, UW, and VW voltages. For a Y-connected electric machine, the line voltage magnitude may be the phase voltage magnitude multiplied by the square root of three.

Figure 4:
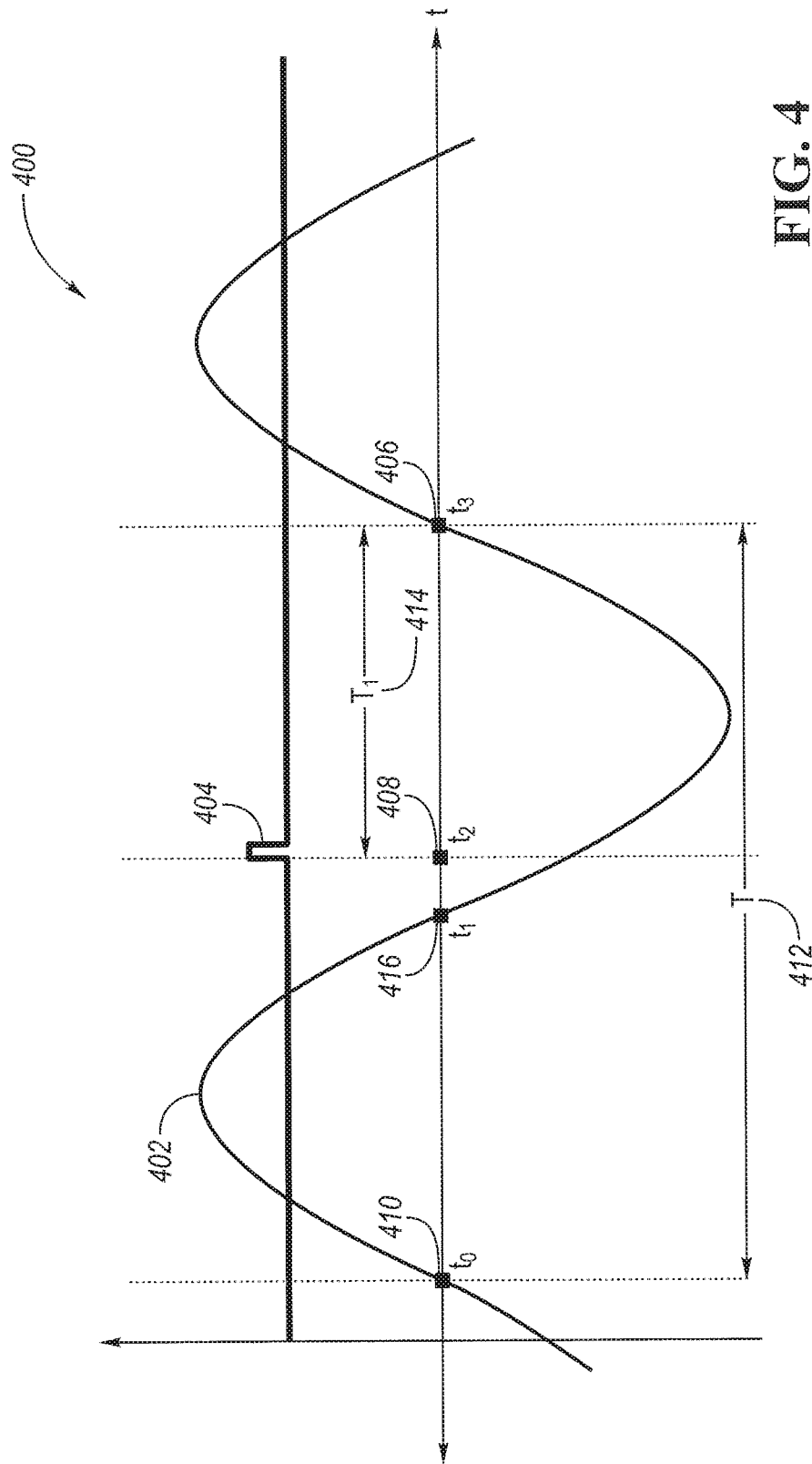
FIG. 4 depicts possible responses of electric machine torque to a sweep of a phase angle that characterizes the current.

The controller 200 may be programmed to determine the resolver offset value during a drive cycle. The controller 200 may measure one of the line voltages of the electric machine 114. When the electric machine 114 is rotated while the switching devices of the inverter are not being switched on, the line voltage will be indicative of the back-EMF of the electric machine 114. As the electric machine is rotating, the back-EMF will be a generally sinusoidal signal. The controller 200 may be programmed to determine the absolute position of the feedback signal of the position/speed feedback device 202 relative to a zero crossing of the line voltage. FIG. 4 depicts a graph 400 of a possible back-EMF signal 402 that is generally sinusoidal. The back-EMF signal 402 may be the voltage measurement of the VW line voltage. At time to 410, there may be a first zero crossing of the back-EMF signal 402. At time to 410, the back-EMF signal 402 is rising or increasing as it passes through zero. At time $t_1$ 416, there may be a second zero crossing of the back-EMF signal 402. At time $t_1$ 416, the back-EMF signal 402 is falling or decreasing as it passes through zero. At time t3 406, there may be a third zero crossing of the back-EMF signal 402. At time t3 406, the back-EMF signal 402 is rising or increasing as it passes through zero.

The time between the zero crossings may define a period of the back-EMF signal 402. For example, the difference between time t3 406 and time to 410 may define a full period, T 412, corresponding to a rotation of 360 degrees of the electric machine shaft. the difference between time t3 406 and time $t_1$ 416 may define a half period corresponding to a rotation of 180 degrees of the electric machine shaft.

The controller 200 may also be configured to receive the index pulse from the position/speed feedback device 202. The index pulse may trigger storage of a timer value at which the pulse occurs. In the example, a marker pulse 404 occurs at time $t_2$ 408. The marker pulse 404 may be indicative of a particular value of the position/speed feedback device 202 (e.g., zero value). The marker pulse 404 and the line voltage measurements may be relative to a common timer.

The controller 200 may be programmed to detect the time of each rising zero crossing of the back-EMF signal 402. In this example, the controller 200 may detect a first rising zero crossing time as time to 410 and a second rising zero crossing time as time $t_3$ 406. In addition, the controller 200 may receive the index pulse 404 and store the associated time $t_2$ 408. The resolver offset may be derived from the time difference between the zero crossing of the line voltage and the index pulse. In this example, the time difference may be represented as the difference between time $t_3$ 406 and time $t_2$ 408. Further, the resolver offset may be derived from a period of oscillation of the line voltage that may be represented by the difference between time $t_3$ 406 and time $t_1$ 410.

The resolver offset may be derived by multiplying a value representing one full rotation of the electric machine (e.g., value representing 360 degrees) by a ratio of the time difference between a zero crossing of the line voltage and the index pulse to the period of oscillation of the line voltage. For example, the value representing a full rotation for a resolver having 16-bit resolution may be 65,535 (0xFFFF in hexadecimal). The resulting resolver offset may be applied to subsequent resolver measurements to properly align the position feedback to the control reference frame. The resolver value corrected with the offset may then be used for electric machine control.

The controller 200 may be configured to record a timer value each time the line voltage sensor is sampled. The controller 200 may periodically sample the line voltage sensor to provide a measurement of the line voltage. Each line voltage value may be timestamped with the timer value. The controller 200 may be programmed to compare consecutive line voltage values to determine the zero crossings. For example, the controller 200 may be programmed to detect when the line voltage values transition from a negative value to a positive value. The time at which the transition occurs may be derived from the associated time stamps. In some configurations, the zero-crossing time may be an interpolated value based on the line voltage measurements and associated timestamps. In some configurations, the controller 200 may include hardware circuitry to generate an event (e.g., interrupt) when a zero crossing occurs. The event may trigger sampling of the timer.

Under proper resolver and electric machine alignment, the VW line voltage and the $X_\beta$ voltage components may be synchronized. When the resolver is not aligned, the zero crossings of the VW line voltage and $X_\beta$ voltage components may be shifted from one another. By learning and the compensating for the resolver alignment, the control signals may be aligned. The proper resolver alignment value permits full control of the electric machine 114. If the resolver alignment is not known or improper, torque control of the electric machine may not be accurate. When the resolver alignment value is unlearned, the controller 200 may operate the inverter and electric machine in a reduced torque or limited mode of operation using a default offset value.

The resolver alignment may be performed opportunistically during a drive cycle to confirm that the alignment has not changed. During modes of operation in which the electric propulsion is not needed, the resolver alignment may be checked. The controller 200 may ensure that the power switches are not turned on for a predetermined interval. The controller 200 may further cause the engine to rotate at a generally constant speed within a predetermined speed range. The predetermined speed range may be selected to ensure that the back-EMF signal will be in a predetermined range of magnitudes. For example, the magnitude and frequency should be high enough so that the zero crossings can be reliably measured. In addition, the magnitude should not be so high as to require active control by the inverter. The controller 200 may be further programmed to, responsive to a speed of the electric machine being within a predetermined range with no demand for electric machine torque, operate the inverter such that the electric machine is unpowered.

During a drive cycle, the controller 200 may monitor for conditions for performing the offset determination. Conditions for performing the offset determination may include the engine being operated within a predetermined speed range. Further, the conditions may include that the engine speed be at a generally constant speed for a predetermined interval. The conditions may further include an amount of time since the last resolver offset determination. The conditions may include detection of service since the last ignition cycle. For example, if the vehicle has been serviced recently, it is possible that the alignment has been altered by the service operation. In some configurations, a resolver alignment event may be triggered by a diagnostic service tool. For example, a flag may be stored indicating that the resolver alignment should be performed. The flag may be cleared after the alignment procedure is performed. The conditions may include that the electric machine is rotating at a constant speed when the electric machine is not powered by the inverter (e.g., unpowered mode of operation). The electric machine may be operated in an unpowered mode when the switching devices of the inverter are not in an on-state so that the current/voltage of the electric machine is not controlled. The electric machine may be operated in an unpowered mode when the inverter is operated such that the inverter is not affecting the voltage of the electric machine.

Figure 5:
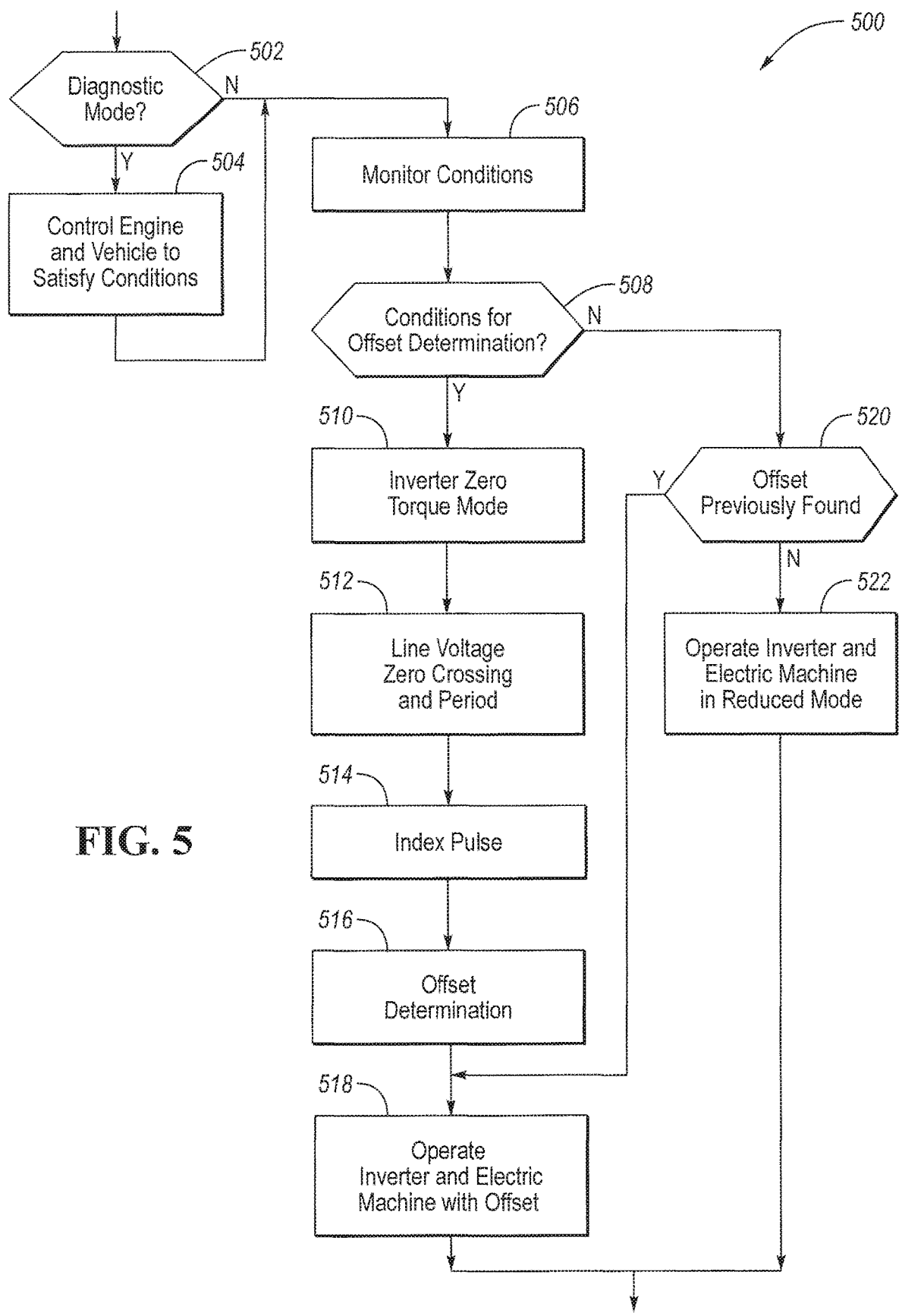
FIG. 5 is a flowchart for a possible sequence of operations for determining a resolver offset.

FIG. 5 depicts a flowchart 500 of a possible sequence of operations that may be implemented for determining the resolver offset value. At operation 502, a check may be performed to determine if the system is in a diagnostic mode of operation. For example, the diagnostic mode of operation may be initiated by a service tool. A command to perform the resolver alignment in a diagnostic mode may have been issued (e.g., diagnostic mode request).

If the system is not in a diagnostic mode, operation 506 may be performed. If the system is in the diagnostic mode, operation 504 may be performed. At operation 504, the controller 200 may be configured to control the vehicle and engine to satisfy the conditions. In some configurations, the engine may be operated within a predetermined speed range at a generally constant speed. In a service environment, the operations may be performed while the vehicle is on a lift or dyno. In some configurations, the controller may be programmed to couple the engine to the electric machine. For example, one or more clutches may be activated to couple the engine to the electric machine. In some configurations, the operator may be expected to achieve the required conditions by driving the vehicle in a prescribed manner (e.g., generally constant vehicle speed). Commands and information may be provided to the operator via the user interface.

At operation 506, the conditions are monitored to determine if the conditions for offset determination are present. For example, the controller 200 may monitor the engine speed, electric machine speed, and line voltage. At operation 508, a check may be performed to determine if the conditions for offset determination are satisfied. For example, one of the conditions may be the engine speed being within a predetermined range and generally constant. An additional condition may be if a predetermined amount of time has elapsed since the last offset determination. The conditions may include the presence of a first vehicle ignition cycle as may occur during vehicle assembly. If the conditions are not present, then operation 520 may be performed. At operation 520, a check may be performed to determine if the resolver offset was previously found. If the resolver offset was not previously found, then operation 522 may be performed to operate the inverter and electric machine in a reduced torque mode. If the offset was previously found, then operation 518 may be performed to operate the electric machine and inverter with the previously found resolver offset with full torque capability. The operations may be periodically repeated. For example, the conditions may be periodically monitored during a drive cycle.

If the conditions for offset determined are satisfied, operation 510 may be performed. At operation 510, the controller 200 may ensure that the inverter is operated in a zero-torque mode. For example, the controller 200 may ensure that no power switching devices are in the on-state for a predetermined time interval. The controller 200 may operate the inverter 126 such that the electric machine 114 is unpowered. At operation 512, the controller 200 may monitor the line voltage for zero crossings and determine the period of oscillation of the line voltage as indicated by the line voltage sensor. At operation 514, the controller 200 may monitor and record the time at which the index pulse occurs. At operation 516, the resolver offset may be determined. The resolver offset may be derived as a product of a value representing one full rotation of the resolver and a ratio of the time difference to a period of oscillation indicated by the line voltage sensor. At operation 518, the controller 200 may operate the electric machine and inverter with the new resolver offset value with full torque capability.

The electric drive system described allows determination or calibration of the resolver offset during a drive cycle. The resolver offset determination may be periodically performed to confirm the offset value. An advantage of the described system is that a formal service procedure can be eliminated for service operations affecting the resolver offset. In addition, the procedure described can eliminate end-of-line calibrations procedures since the offset can be automatically learned.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a resolver coupled to an electric machine and configured to provide an index pulse;
   an inverter having a line voltage sensor; and a controller programmed to,
   responsive to the electric machine rotating at a constant speed while not being powered by the inverter, generate an offset for the resolver as a ratio of a time difference between the index pulse and a zero crossing indicated by the line voltage sensor and a period of oscillation associated with periodically sampling the line voltage sensor, and through transformation of three-phase currents to a q-axis torque component and d-axis flux component and transformation of the q-axis torque component and d-axis flux component to a three-phase voltage or current waveform, and
   operate the inverter using the offset.

2. The vehicle of claim 1 wherein the controller is further programmed to cause an engine that is coupled to the electric machine to rotate at a predetermined constant speed.

3. The vehicle of claim 1 wherein the inverter is configured to provide a U-phase voltage, a V-phase voltage, and NV-phase voltage and wherein the line voltage sensor is configured to measure a voltage difference between the V-phase voltage and the W-phase voltage.

4. The vehicle of claim 1 wherein the controller is further programmed to generate the offset during a drive cycle.

5. The vehicle of claim 1 wherein the controller is further programmed to generate the offset responsive to a diagnostic mode request.

6. The vehicle of claim 1 wherein the controller is further programmed to, responsive to a first vehicle ignition cycle, operate the inverter to control the electric machine in a reduced torque capability mode of operation, and, responsive to generating the offset, operate the inverter to control the electric machine in a full torque capability mode of operation.

7. A method comprising:
   responsive to an electric machine rotating at a constant speed while not being powered by an inverter, generating an offset for a resolver as a ratio of a time difference between an index pulse provided by the resolver and a zero crossing indicated by a line voltage sensor of the inverter and a period of oscillation associated with periodically sampling the line voltage sensor, and through transformation of three-phase currents to a q-axis torque component and d-axis flux component and transformation of the q-axis torque component and d-axis flux component to a three-phase voltage or current waveform; and
   operating the inverter using the offset.

8. The method of claim 7 further comprising causing an engine that is coupled to the electric machine to rotate at a predetermined constant speed.

9. The method of claim 7 further comprising, responsive to a first vehicle ignition cycle, operating the inverter to control the electric machine in a reduced torque capability mode of operation, and, responsive to the generating, operating the inverter to control the electric machine in a full torque capability mode of operation.

* * * * *